(12) United States Patent
Kodimer

(10) Patent No.: US 12,086,229 B2
(45) Date of Patent: Sep. 10, 2024

(54) SYSTEM AND METHOD FOR REGISTRATION OF CARD KEYS FOR MULTIFUNCTION PERIPHERAL OPERATION

(71) Applicant: Toshiba TEC Kabushiki Kaisha, Shinagawa-ku (JP)

(72) Inventor: Marianne Kodimer, Huntington Beach, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 17/676,428

(22) Filed: Feb. 21, 2022

(65) Prior Publication Data
US 2023/0267189 A1 Aug. 24, 2023

(51) Int. Cl.
G06F 21/34 (2013.01)
(52) U.S. Cl.
CPC .................................. *G06F 21/34* (2013.01)
(58) Field of Classification Search
None
See application file for complete search history.

(56) References Cited

U.S. PATENT DOCUMENTS

| | | | |
|---|---|---|---|
| 2011/0197271 A1* | 8/2011 | Buck | H04L 9/3215 726/9 |
| 2012/0109762 A1* | 5/2012 | Getchius | G06Q 20/204 705/17 |
| 2013/0114100 A1* | 5/2013 | Torii | H04N 1/00037 358/1.14 |
| 2014/0226173 A1* | 8/2014 | Tredoux | H04W 12/30 358/1.14 |
| 2015/0178732 A1* | 6/2015 | Laracey | G06Q 20/3274 235/379 |
| 2020/0366484 A1* | 11/2020 | So | H04L 9/3213 |
| 2021/0400466 A1* | 12/2021 | Chaugule | H04W 88/02 |

FOREIGN PATENT DOCUMENTS

KR 20210083066 A * 7/2021

* cited by examiner

*Primary Examiner* — Bassam A Noaman
(74) *Attorney, Agent, or Firm* — UB Greensfelder LLP; John X Garred

(57) ABSTRACT

A system and method for PIN authentication issuance from a MFP QR Code includes a QR code presented on an authentication screen of multifunction peripheral display. A user requiring a personal information number to access a multifunction peripheral printing system managed by a print server scans the QR code with their secure smartphone or tablet. The scanned QR code opens a web portal to the sever on the user's device where they can select a new PIN. The new PIN is stored on the server for the user' account and access to the MFP is then granted when the user enters their new PIN.

16 Claims, 7 Drawing Sheets

SYSTEM AND METHOD FOR REGISTRATION OF CARD KEYS FOR MULTIFUNCTION PERIPHERAL OPERATION

TECHNICAL FIELD

This application relates generally to print management and accounting in a print network. The application relates more particularly to displaying an encoded image for scanning by a secure, portable user device upon detection of use of an unregistered card to commence registration via the portable user device.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are often shared by multiple users who must login to devices to use them.

BRIEF DESCRIPTION OF THE DRAWINGS

Various embodiments will become better understood with regard to the following description, appended claims and accompanying drawings wherein:

DETAILED DESCRIPTION

Figure 1:
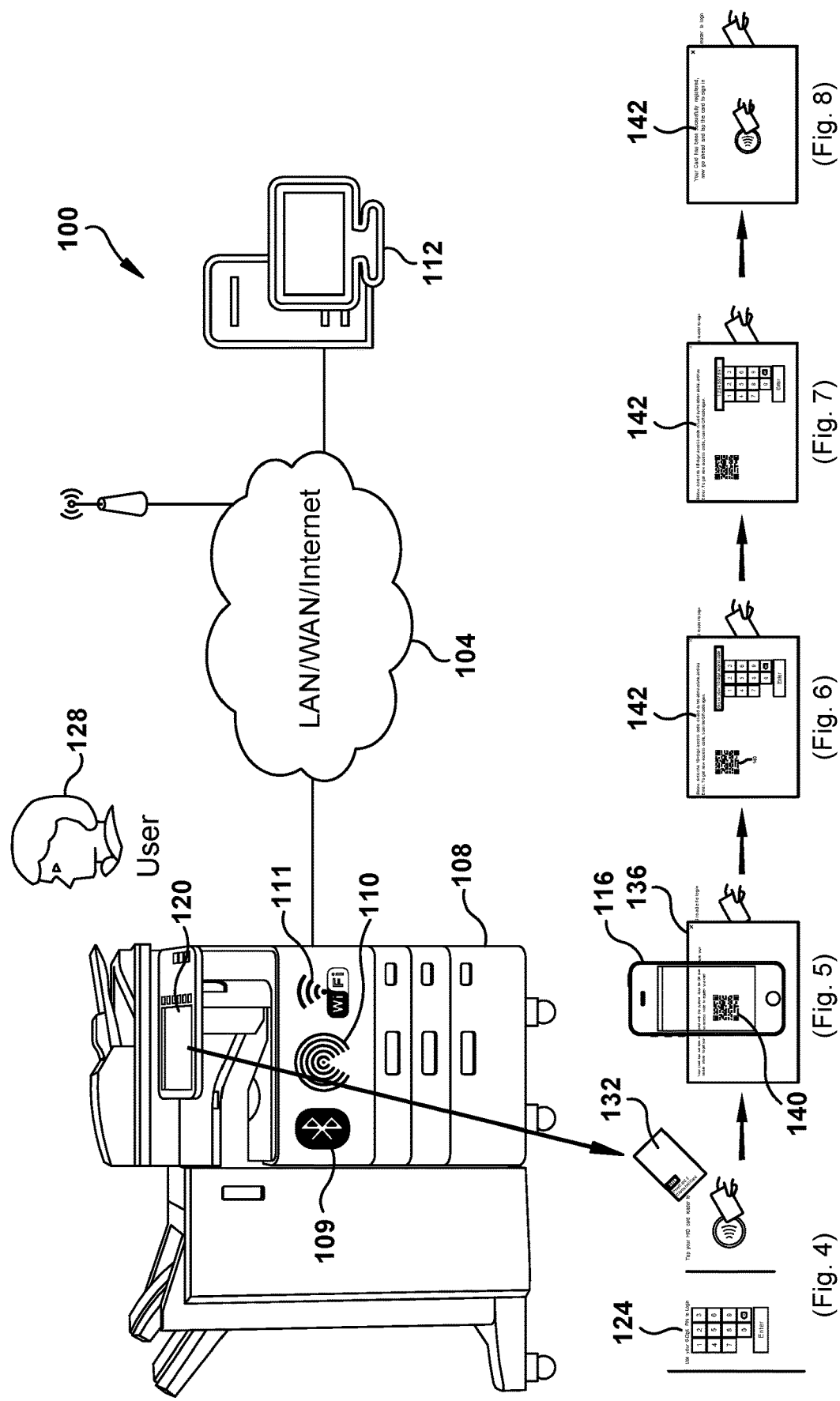
FIG. 1 is an example embodiment of a system for PIN authentication issuance from a MFP QR Code.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As noted above, MFPs are frequently shared among multiple users. Users must login to an MFP before they can use it. Login information allows for control of device features, job monitoring and job cost accounting. In environments with multiple, networked MFPs, management and accounting functions may be managed by one or more networked print servers. When a user logs in to an MFP, they are identified and their account information accessed in concert with the print server. Fees for MFP services may be debited from the user's prepaid account or charged to their credit card.

Print Management may be accomplished with a system such as PaperCut or SkyPrint. SkyPrint is used in example embodiments herein, however it is understood that any suitable networked print management system can be used. Example embodiment herein implement portable personal data devices, such as smartphones or tablet computers. While certain examples may include reference to smartphones, it is to be understood that any suitable personal data device can be used.

Currently, in applications such as SkyPrint, users must be preregistered on an administrative (admin) portal to use MFP functions. Companies may use card keys read by an MFP card reader to identify users, unlock MFP functions and communicate cost accounting to the print management system to, for example, debit an account of a user associated with a card.

Example embodiments herein describe a system, including a user interface (UI) and workflow, wherein an MFP user can use an MFP-supplied login encoded image, such as QR code or barcode, displayed on the MFP's front panel to register a new card key to be used at the MFP. While example embodiments herein refer to a QR code, it is to be understood that any scan-able encoded indicia can be used.

Currently, in an app such as SkyPrint, a user must be preregistered on an admin portal to use functionality at the copier. Registration may be accomplished with the issuing of a one-time code to be associated with a new key card. A user is given access to a print server admin portal, suitably from an MFP front panel, to retrieve this one-time access code to enable use of the MFP. The user accesses the web portal, navigates to the access code and returns to the MFP to complete the task of card registration. While this is effective, there are additional steps required which can be disruptive to the user's workflow.

Example embodiments herein detail a UI and workflow wherein if the MFP user attempts to access the copier front panel for the first time with a card key that is not yet registered, an error message will be shown along with a QR code that the user can scan with their mobile device from the MFP display to directly launch the admin portal page to automatically obtain one-time access code to register the card key without disrupting the user's workflow with no need to leave the MFP location.

An error message with a QR code leads to invoking a secure page from the user's secure and trusted mobile device instead of the MFP to complete registration of access card or other login method.

Before using a card key such as an Hughes Identification Device (HID) to login to an MFP that is tied to a print management system, the card must first be registered with the print management system. This is done by logging into the web portal and manually registering the card with the print management server. Specifically, the user gets a one-time registration code from the web portal, and then returns to the copier to enter the one-time registration code and associate it with the card swipe of a newly issued card key.

The user experience is not optimal. In example embodiments herein, the user is able to complete registration at the MFP. Towards this end, this system provides an error message on a newly unregistered card key along with the QR code. The user scans the QR code with their portable data device, such a smartphone or tablet computer, to invoke a web portal where the user has been previously registered. The user gets the one-time registration code on his their device and enters it into the MFP front panel to complete registration without leaving the copier side.

FIG. 1 illustrates an example embodiment of a system 100 for registration of card keys for MFP operation. Included in FIG. 1 is network cloud 104 suitably comprised of a local area network (LAN), a wide area network (WAN), which may comprise the Internet, or any suitable combination thereof. Network cloud 104 is comprised of any suitable wireless or wired data connection or combination thereof. Network cloud 104 provides a data connection between MFP 108, network print server, such as a SkyPrint server, 112 and a portable personal data device illustrated as smartphone 116, but suitably comprised of any suitable device, such as a tablet computer. The user's device is identified with them and is secure, such as with a password, PIN code, biometric or pattern input. MFP 108 includes a user interface, such as touchscreen 120 that displays an authentication screen 124 for user sign in, suitably via entry of a PIN code or by reading a proximity card, for access to MFP functions. Further details relative to authentication screen 124 follow with reference to FIG. 4, below. MFP 108 also includes wireless data communication, such as via Bluetooth 109, RFID 110 and Wi-Fi 111. Authentication and job accounting is suitably accomplished via server 112. In the illustrated example, user 128 does not have or does not recall their PIN, but has a card key 132 which is unregistered. Authentication screen 124 displays a PIN entry pad and an embedded card reader as will be detailed below in connection with FIG. 4. User 128 brings their card key 132 proximate to authentication screen 124 and a determination is made by the MFP and/or print server that the card is unregistered. This results in a generation of error screen 136 that includes an encoded indicia illustrated as QR code 140 and an associated error message. Further details as to error screen 136 are provided in connection with FIG. 5, below.

A digital camera in smartphone 116 captures an image of QR code 140 and the smartphone decodes it. The decoded QR code launches a web portal to server 112 from which a one-time code is obtained. Screen 142 is generated by the MFP providing a keypad for entry of the one-time code. Screen 144 illustrates the one-time code after keypad entry which registers the card key to the user and their account, enabling card key login at screen 148. QR code 140, and screens 144 and 148 are detailed in connection with FIGS. 6-8 below.

Figure 2:
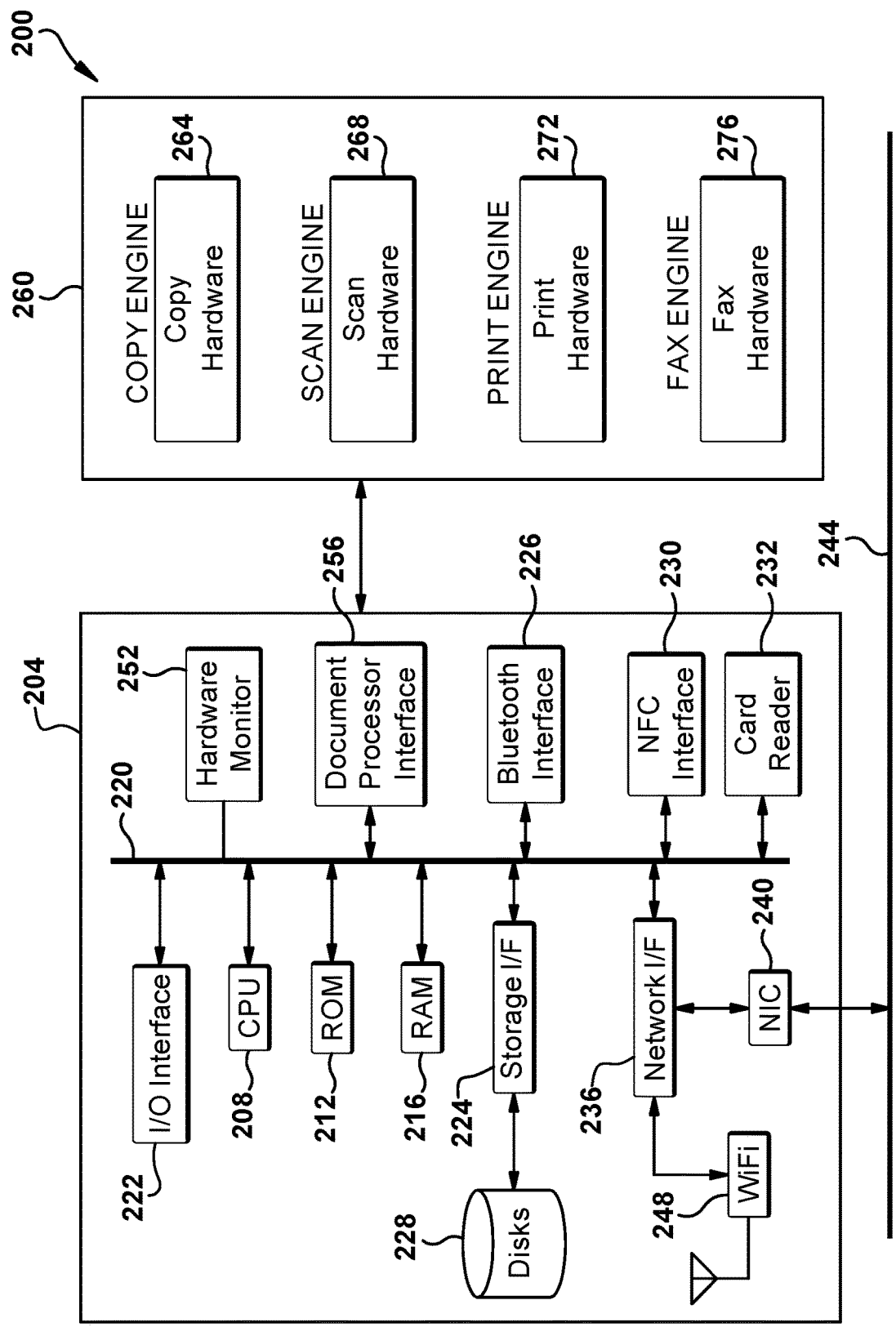
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 108 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) network interface 248 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise MFP document rendering system 260. It will be understood that functional units are suitably comprised of intelligent units, including any suitable hardware or software platform.

Figure 3:
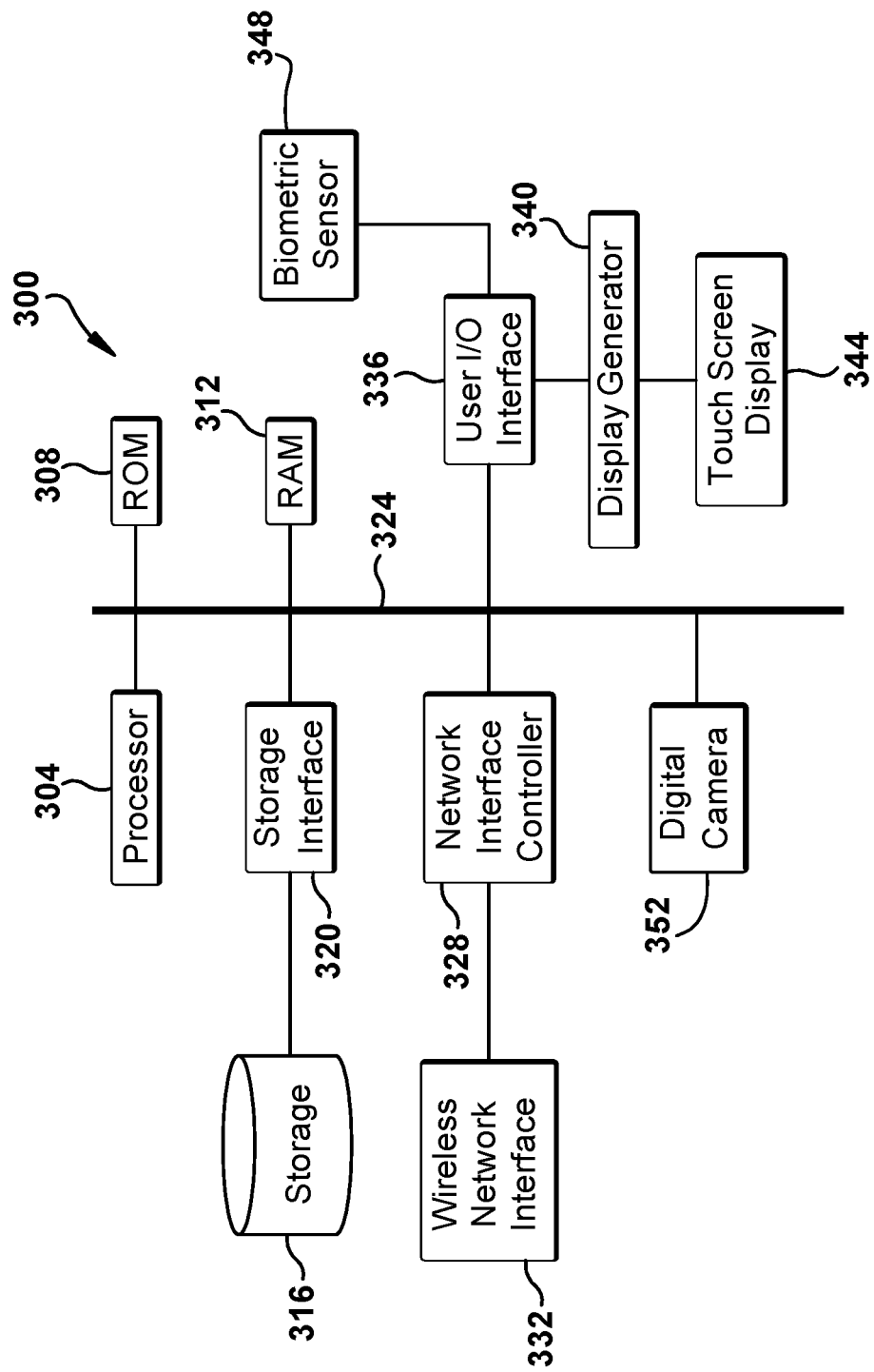
FIG. 3 is an example embodiment of a digital device system such as a smartphone or server.

Turning now to FIG. 3, illustrated is an example embodiment of a digital data processing device 300 such as server 112 or smartphone 116 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. User input/output interface 336 also provides connection to biometric sensor 348, suitably comprised of a fingerprint sensor, retinal sensor, or the like, and may be used to secure device access to one or more users. Processor 304 processor is also in data communication with a digital camera 352, suitably used to capture images which may include encoded images such as barcodes or QR codes. Digital camera 352 is also suitably used for facial recognition, including facial recognition for securing device access.

Figure 4:
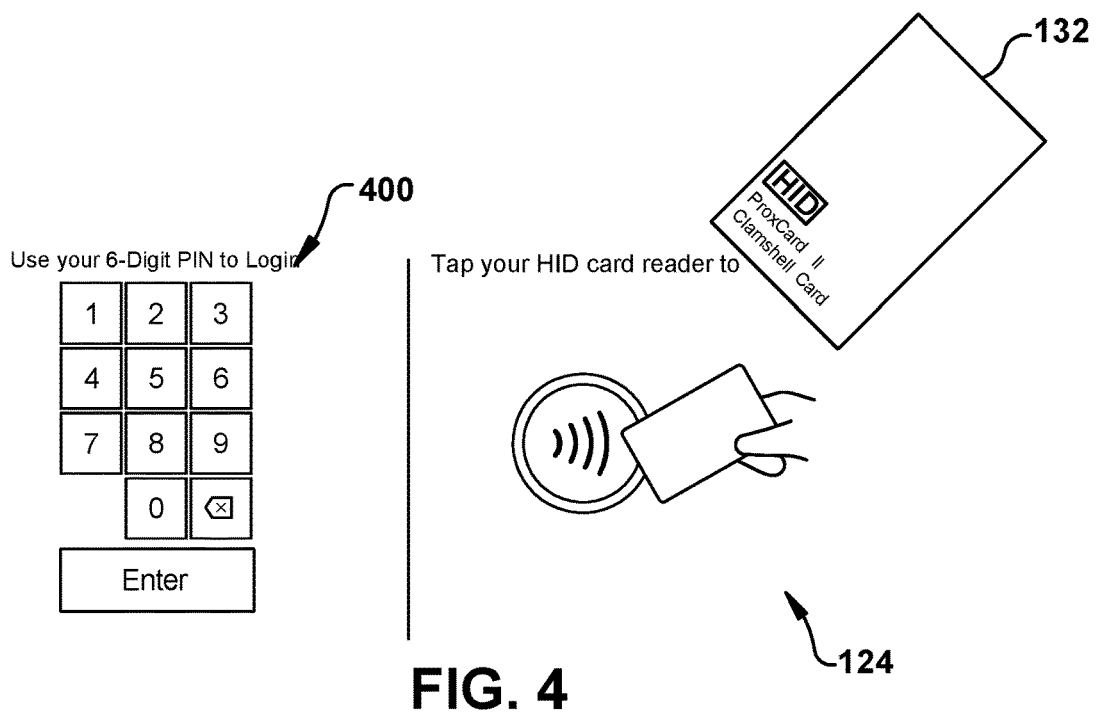
FIG. 4 is an enlarged view of an authentication screen depicted in FIG. 1.

FIG. 4 is an enlarged view of authentication screen 124 of FIG. 1. The screen displays touchscreen keypad 400 for PIN code entry. Entry of a valid PIN code allows for identification of an identified, authorized user and facilitates access to MFP functionality. Identification is also suitably done with a proximity device such as a RFID or HID card key 132 that is brought in close proximity to authentication screen 124. Authentication is may also be done via alternatives such as Bluetooth or Wi-Fi direct.

Figure 5:
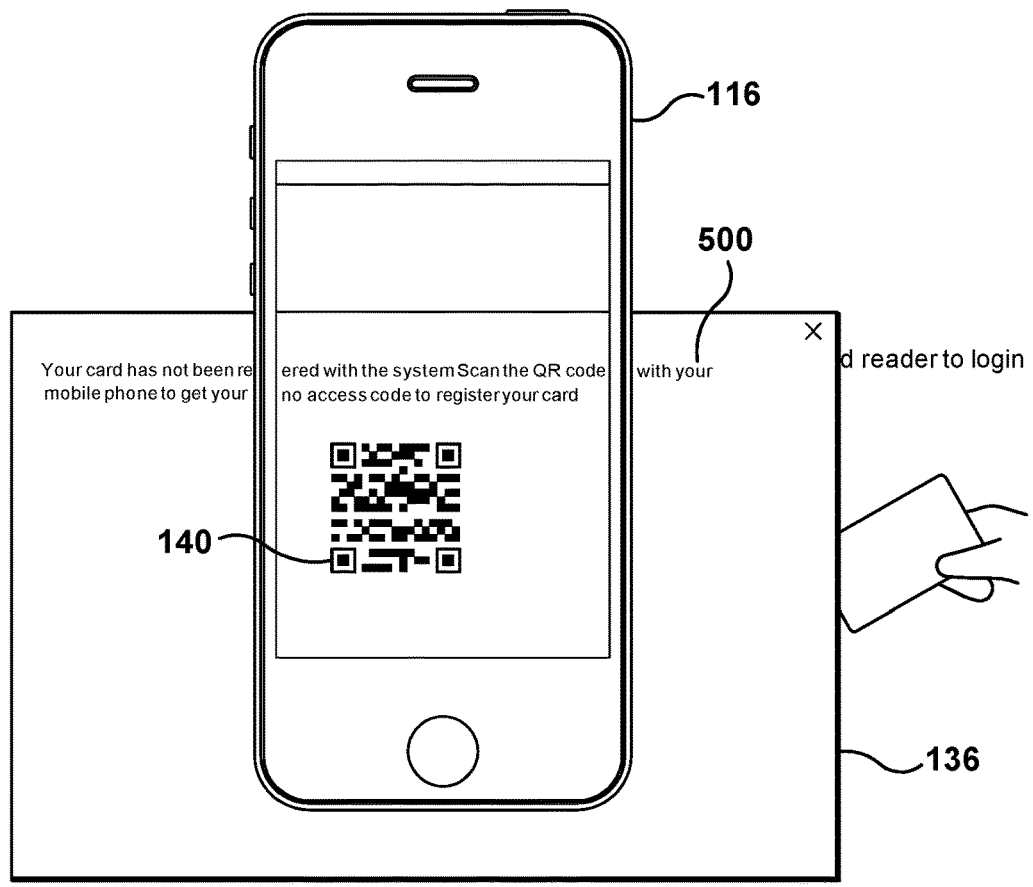
FIG. 5 is an enlarged view of a screen sequence depicted in FIG. 1.

FIG. 5 is an enlarged view of error screen 136 of FIG. 1 showing QR code 140 positioned for scanning by smartphone 116. Also displayed is error message 500 informing the user that their card is not registered and directing them to scan the QR Code with their device.

Figure 6:
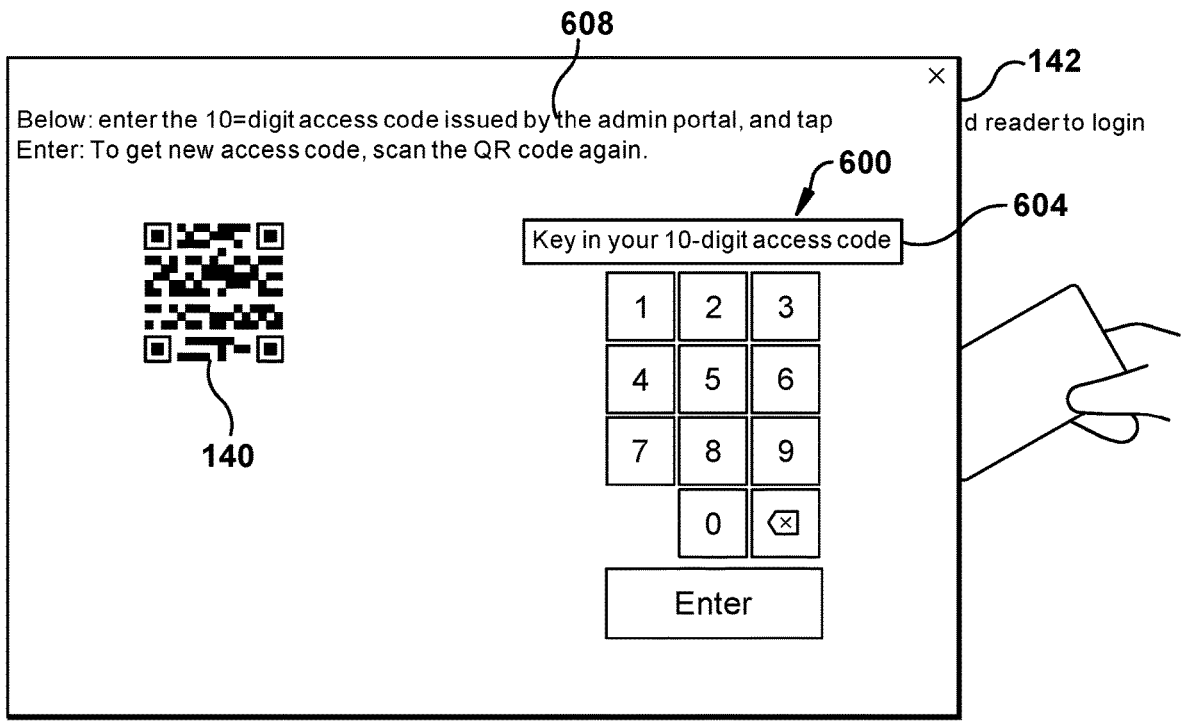
FIG. 6 is a flowchart of an example embodiment of a system for PIN authentication issuance from a MFP QR Code.

FIG. 6 is an enlarged view of screen 142 of FIG. 1 showing authentication code entry keys 600 and input display window 604, wherein the user is prompted to input their newly acquired registration code with message 608. The user may also secure another code by scanning QR code 140.

Figure 7:
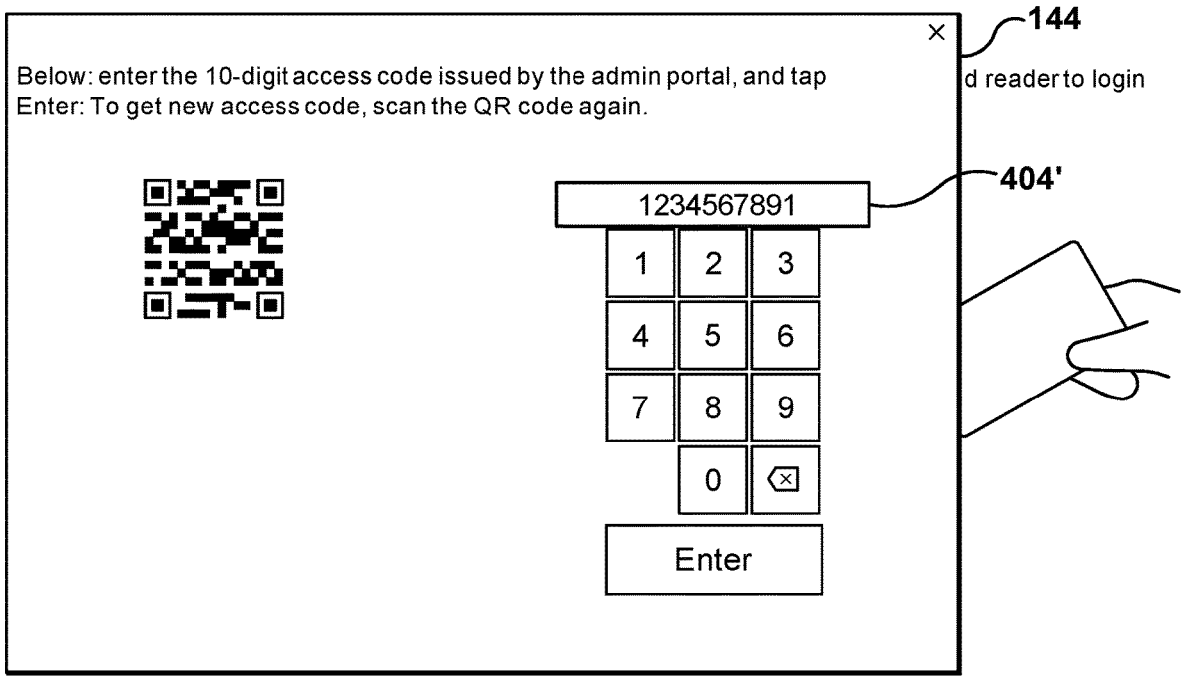
FIG. 7 is a flowchart of an example embodiment of a system for PIN authentication issuance from a MFP QR Code.

FIG. 7 is an enlarged view of screen 144 of FIG. 1 showing a populated data entry window 404' displaying the code input by the user.

Figure 8:
FIG. 8 is an enlarged view of screen 148 of FIG. 1.

FIG. 8 is an enlarged view of screen 148 of FIG. 1 prompting the user to tap their newly registered card to authenticate to the MFP.

Figure 9:
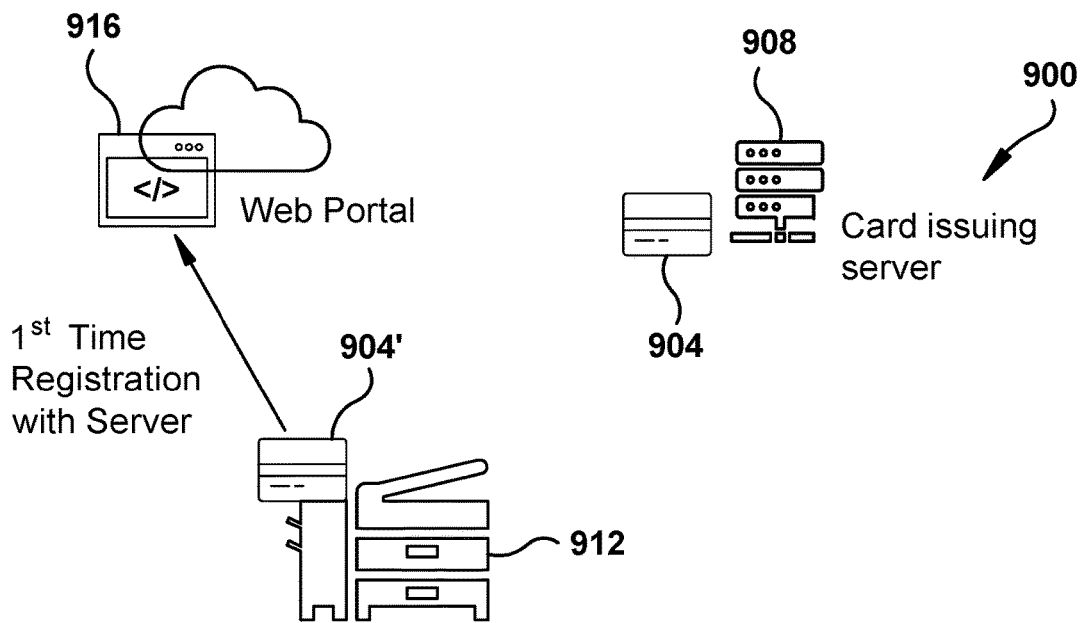
FIG. 9 is a system diagram of a system for registration of card keys for MFP operation.

FIG. 9 is a system diagram 900 of a system for registration of card keys for MFP operation. Card keys, such as card key 904 are generated by card issuing server 908. When a user uses their card key illustrated as 904' at MFP 912, registration is commenced by opening web portal 916 on the user's portable data device.

Figure 10:
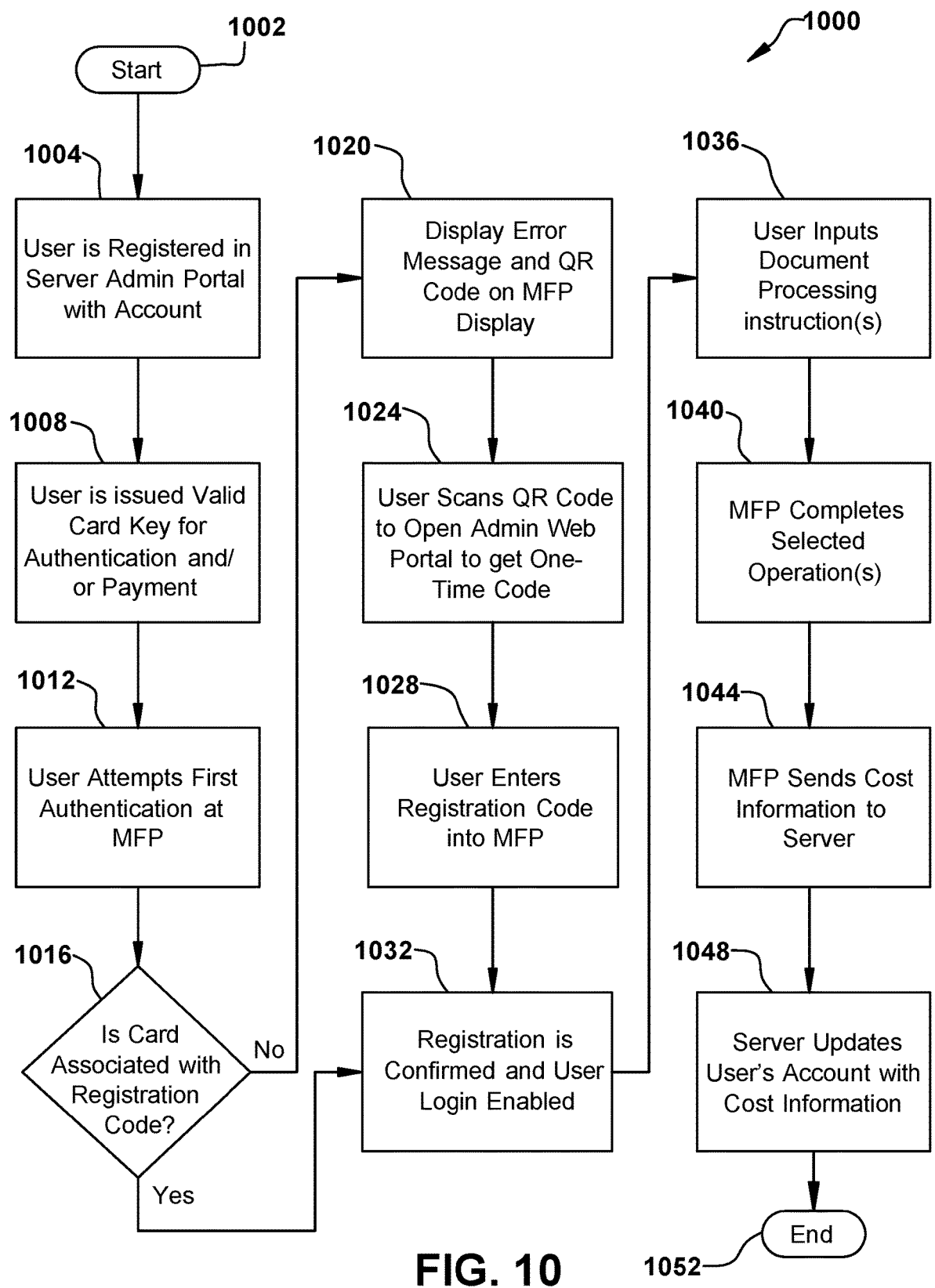
FIG. 10 is a flowchart 1000 of a system for registration of card keys for MFP operation.

FIG. 10 is a flowchart 1000 of a system for registration of card keys for MFP operation. The process commences at block 1002 and proceeds to block 1004 where a user is registered with an account via a server admin portal. The user is issued a valid card key for MFP authentication and/or payment for document processing operations at block 1008. The user attempts to user their card key at block 1012. A test is made at block 1016 to determine whether the card has been registered. If not, an error message and QR code are shown on the MFP display at block 1020. The user scans the barcode with their device at block 1024 to receive their one-time code. The user inputs a received one-time code displayed on their device into the MFP at block 1028. Registration is confirmed and authentication or login is confirmed at block 1032. The user then inputs their document processing instructions at block 1036 and the MFP completes them at block 1040. Cost information associated with the document processing operations is sent to a server at block 1044 which updates the user's account at block 1048. The process terminates at block 1052. If it is determined that the user's card was already associated with a registration code at block 1016, the system passes directly to block 1032.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor and associated memory;
a touchscreen display;
a network interface;
a digital camera;
a multifunction peripheral including an intelligent controller, a card reader and a display;
a card key, registered to a device user, proximate to the card reader;
the multifunction peripheral configured to obtain a code from the card key via the card reader;
the multifunction peripheral further configured to determine whether the code obtained from the card key is associated with a registration for use of the multifunction peripheral;
the multifunction peripheral further configured to generate an encoded image on the display when the code obtained from the card key is not associated with a registration for use of the multifunction peripheral;
the digital camera configured to capture the encoded image;
the processor configured to decode a captured encoded image;
the processor further configured to open a web portal to an associated server specified by a decoded image via the network interface;
the processor further configured to receive a registration code from a server via the web portal; and
the processor further configured to show the registration code on the touchscreen display;
wherein the multifunction peripheral further includes a user input configured to receive the registration code from the user; and
wherein the multifunction peripheral is further configured to register the user for use of the multifunction peripheral and enable execution of document processing instructions from the user after receiving the registration code.

2. The system of claim 1 wherein the encoded image is comprised of a QR code.

3. The system of claim 2 wherein the multifunction peripheral is further configured to enable execution of document processing instructions when it is determined that the code obtained from the card key is associated with a registration for use of the multifunction peripheral.

4. The system of claim 3 wherein the multifunction peripheral is further configured to determine whether the code obtained from the card key is associated with a registration for use of the multifunction peripheral in accordance with a network connection to the server.

5. The system of claim 1 wherein the multifunction peripheral is further configured to show an error message on the display when the code obtained from the card key is not associated with registration for use of the multifunction peripheral.

6. A method comprising:
obtaining a code from a card key registered to a device user via a card reader;
determining, via a processor and associated memory, whether the code obtained from the card key is associated with a registration for use of the multifunction peripheral;

generating an encoded image on a display when the code obtained from the card key is not associated with a registration for use of the multifunction peripheral;
capturing the encoded image;
decoding a captured encoded image;
opening a web portal to an associated server specified by a decoded image via a network interface; and
receiving a registration code from a server via the web portal;
showing the registration code on a touchscreen display;
receiving the registration code from the user into a multifunction peripheral user interface;
registering the user for use of the multifunction peripheral after receiving the registration code from the user; and
enabling execution of document processing instructions from the user after receiving the registration code from the user.

7. The method of claim 6 wherein the encoded image is comprised of a QR code.

8. The method of claim 7 further comprising enabling execution of document processing instructions when it is determined that the code obtained from the card key is associated with a registration for use of the multifunction peripheral.

9. The method of claim 8 further comprising determining whether the code obtained from the card key is associated with the print registration in accordance with a network connection to the server.

10. The method of claim 6 further comprising showing an error message on the display when the code obtained from the card key is not associated with a registration for use of the multifunction peripheral.

11. A system comprising:
a multifunction peripheral including
an MFP processor
memory,
an MFP network interface,
an MFP touchscreen, and
a digital card reader;
a portable data device and an associated digital card key, the portable data device including
a data device processor,
memory,
a data device network interface
a data server touchscreen, and
a digital camera; and
a server including
a server processor,
memory storing a user account data associatively with user accounts of each of a plurality of identified users, and
a server network interface;
wherein the multifunction peripheral is configured to
read data from a card key proximate to the digital card reader,
contact the server in accordance with data read from the card key,
receive a response from the server indicating whether the card key is registered for use with the multifunction peripheral,
enable document processing for the user associated with the card key when the response from the server indicates that the card key is registered for use with the multifunction peripheral, and
show an encoded image on its touchscreen display when the response from the server indicates that the card key is not registered for use with the multifunction peripheral;
wherein
the portable data device having a camera is configured to
capture an image of the encoded image with the camera,
decode a captured image,
open a data connection with the server in accordance with a decoded image, and
receive and display a one-time code from the server;
wherein the multifunction peripheral is further configured to
receive the one-time code from the user via its touchscreen interface,
register the card key for use of the multifunction peripheral in accordance data communication with the server, and
enable document processing in connection with the registered card key.

12. The system of claim 11 wherein the portable data device is secured to the user in accordance with one or more of a password, PIN code, biometric or pattern input.

13. The system of claim 12 wherein the encoded image is comprised of a barcode or a QR code.

14. The system of claim 13 wherein the multifunction peripheral is further configured to show an error message on its touchscreen when the encoded image is shown.

15. The system of claim 12 wherein the multifunction peripheral is further configured to receive and execute one or more document processing instructions from the user when enabled and communicate charge data associated with a cost of executing the one or more document processing instructions to the server.

16. The system of claim 15 wherein the server debits the user account in accordance with charge data received from the multifunction peripheral.

* * * * *